Aug. 10, 1926.
W. F. HEATH, JR
1,595,091
RADIATOR CAP
Filed Feb. 16, 1922
2 Sheets-Sheet 1
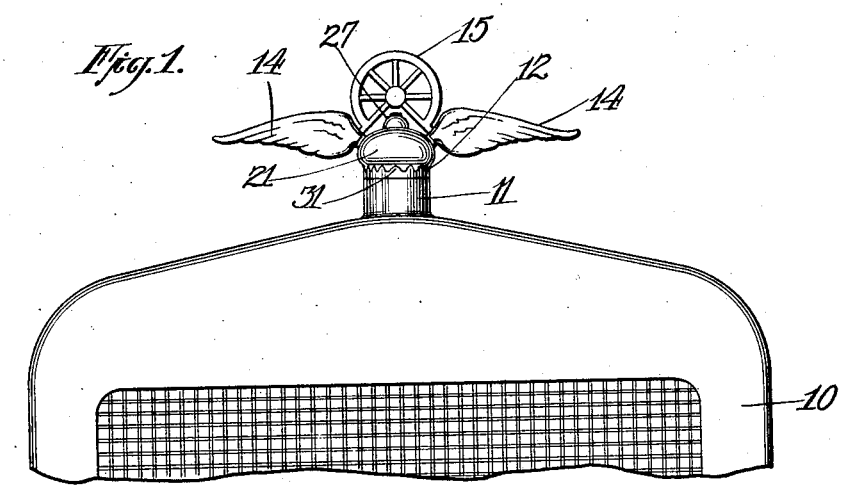
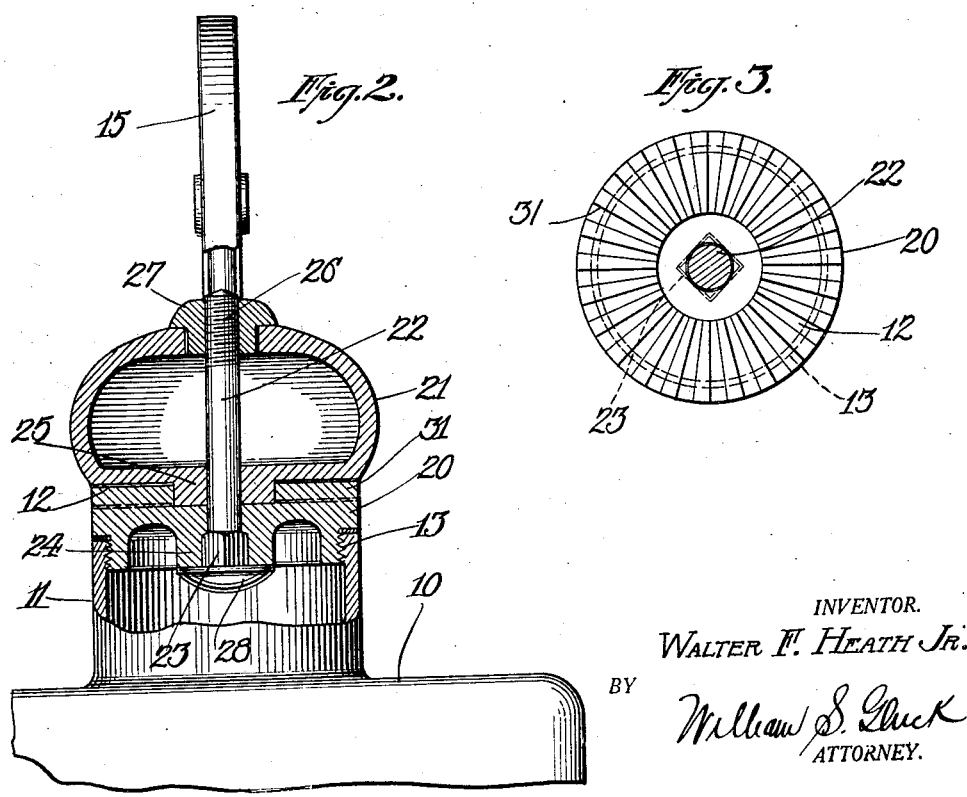
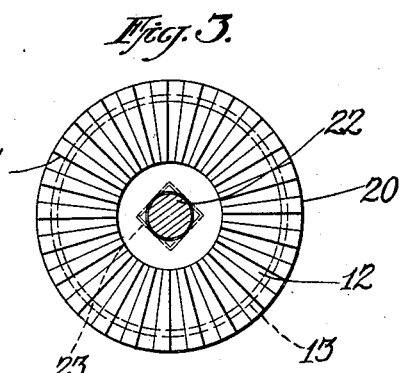
INVENTOR.
WALTER F. HEATH JR.
BY
William S. Gluck
ATTORNEY.

Aug. 10, 1926. 1,595,091
W. F. HEATH, JR
RADIATOR CAP
Filed Feb. 16, 1922  2 Sheets-Sheet 2
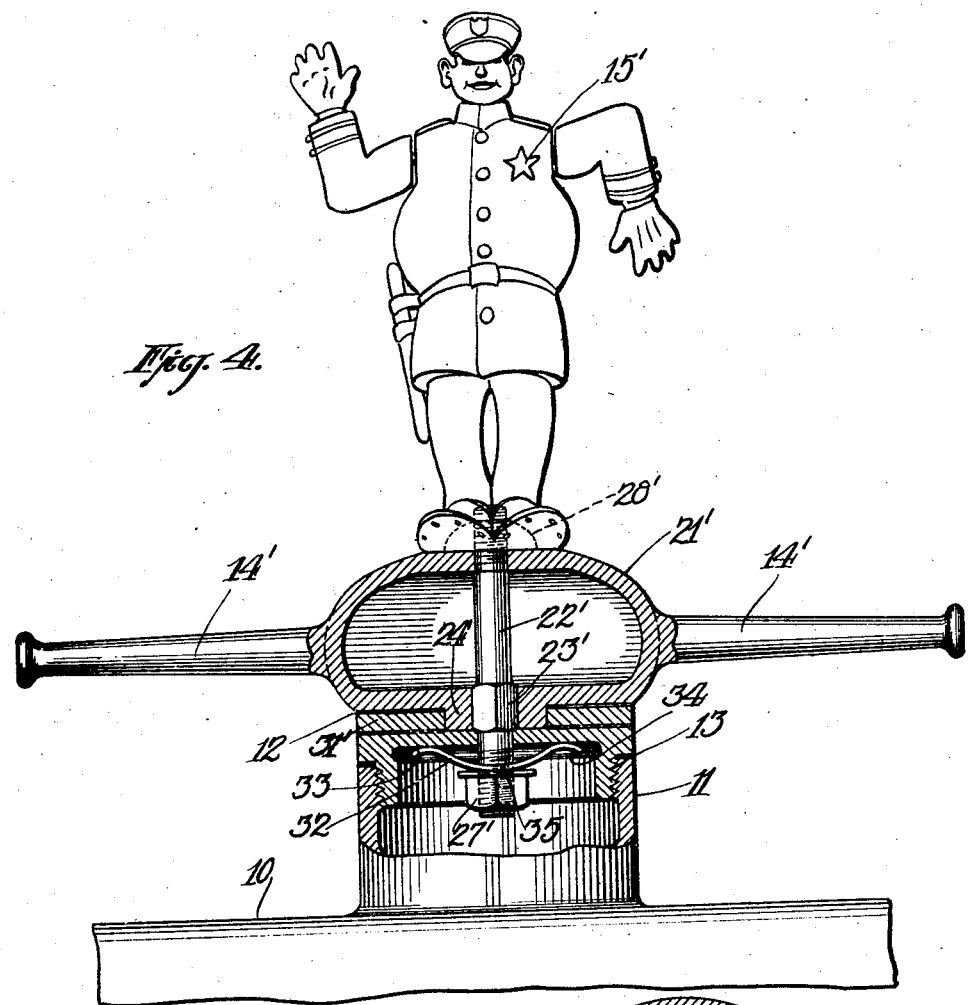
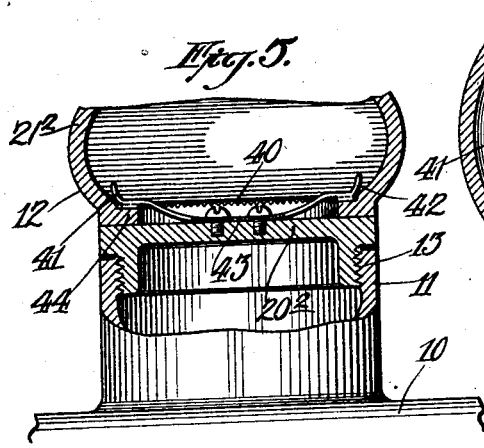
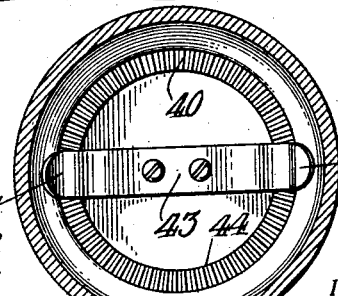
INVENTOR.
WALTER F HEATH JR.
BY William S. Gluck
ATTORNEY.

Patented Aug. 10, 1926.

1,595,091

UNITED STATES PATENT OFFICE.

WALTER F. HEATH, JR., OF NEW YORK, N. Y.

RADIATOR CAP.

Application filed February 16, 1922. Serial No. 537,130.

My present invention relates generally to a manner of supporting a vehicle attachment so that its desired predetermined position and association may be maintained, and more particularly to an arrangement for so supporting from a vehicle an attachment having an ornamental coaction therewith, that such coaction or association may be maintained, regardless of any changes or variations in the position or relationship of the supporting structure.

Among the more important objects of my invention therefore are; the provision with an attachment having a positional association with a vehicle and more particularly an angular positional relationship, of means for maintaining said attachment in its predetermined positional association; the provision of so supporting a vehicle attachment from a movable supporting member that the positional relationship of the attachment with reference to the vehicle, can be maintained as desired, regardless of the positional relationship of the supporting member with reference to the vehicle; the provision of a vehicle attachment so supported by the radiator cap that the positional relationship of the attachment can be maintained as desired regardless of the positional relationship of the cap; the provision of a radiator cap and an attachment carried thereby, associated for relative variation; the provision of a radiator cap and an attachment thereon which is intended to have a predetermined angular positional relationship to the vehicle, so associated that such attachment may have this predetermined relationship regardless of the extent to which the cap is rotated; the provision of a radiator cap having a plurality of relatively movable parts; the provision of a radiator cap having a plurality or relatively movable parts one of which carries an ornamental attachment; and the provision generally of a new and improved cap and of a new association of a radiator cap and an ornamental feature carried thereby.

For attaining these objects and such other objects as may appear or be pointed out, I have illustrated various embodiments of my invention in the drawings, wherein—

Figure 1 is a front elevational view of the upper part of the cooling radiator of an automobile, illustrating my invention;

Figure 2 is a side view partly in section of the radiator cap with the attachments thereon;

Figure 3 is a view in horizontal section taken on a line between the two parts of the radiator cap of Figure 2.

Figure 4 is a front elevational view partly in section of another embodiment;

Figure 5 is a view partly in vertical section of still another embodiment; and

Figure 6 is a horizontal sectional view through Figure 5 taken above the position of the spring.

Upon viewing Figure 2, it will be observed that the cap 12 comprises generally the two parts 20 and 21, the lower part being threaded to secure the cap 12 in position and the upper part 21 serving to carry the attachment or ornament which in the various figures of the drawings are shown at 14, 14', 15 and 15'.

The two parts 20 and 21 of the radiator cap 12 are secured together for angular variation relatively to each other by means such as the bolt 22 which has a nonrotatable engagement with the cap part 20 through the engagement of the squared part 23 of the bolt 22, in the squared opening formed in the web 24 of the part 20. This bolt 22 passes through the lower web 25 of the cap part 21 for free relative rotation of the bolt 22 and part 21, and the bolt 22 has its upper end 26 threaded, the length of the bolt 22 being such that this screw threaded end 26 may extend sufficiently beyond the upper end of the upper cap part 21 to permit of its engagement by the nut 27, the bolt head 28 engaging the web 24 of the cap part 20 and thus forming a stop abutment.

The wings 14 are preferably mounted directly on the cap part 21 and in turn carry the emblem wheel 15.

From the construction thus far described, it will be obvious that in use the cap 12 is turned until it is in full threaded engagement with the opening 11. If this results in the wings 14 being positioned other than absolutely diametrically of the longitudinal axis of the vehicle, the nut 27 is loosened sufficiently to permit giving the part 21 a sufficient angular movement, to bring the wings 14 to the desired position.

For maintaining the cap parts 20 and 21 in their desired or predetermined relative positions of angularity, I provide the contacting faces of the webs 24 and 25 with radially formed ribs 31, so arranged that the ribs of one will engage between the ribs of the other. In this way, when the nut 27 is loosened, the webs 24 and 25 can be separated sufficiently to permit of the desired relative angular relation of the parts 20 and 21, upon which the ribs 31 may be re-engaged by turning down the nut 27.

In Figure 4 I have illustrated a modified embodiment in which the figure 15' of a traffic officer and the capstan bars 14' are secured directly to the upper cap part 21'. The position of the bolt 22' is reversed, the head 28' being at the top, and the nut 27' at the bottom. In this form also the bolt 22' is squared at 23' into the squared opening in the web 24' of the cap part 21', the bolt 22' passing through the cap part 20' for free rotation of the two. I provide a leaf spring 32 engaging about the bolt 22 intermediate its ends at 35. This spring is arranged to have its end 33 and 34, abut against the web 44 so as to cause this intermediate portion to maintain the bolt 22' in its lower-most position, and consequently to cause an interlocking engagement between the ribs 31'.

When in the use of my embodiment of Figure 4, it is desired to attain an angular adjustment between the parts 20' and 21', these parts are separated by the application of the desired pressure directly to these parts, until the ribs 31' are disengaged, upon which the desired adjustment can be made, the parts automatically resuming their locked position of adjustment with the ribs 31' engaged.

In the embodiment of Figure 5, I dispense with the use both of the bolt and of the interlocking ribs. This I attain by corrugating or ribbing the part 21² as shown at 40. These ribs are engaged by the ends 41 and 42 of the spring 43 secured intermediate such ends to the top of the web 24² of the part 20² in any desired manner such as screws. By providing ribs 40 on the upper surface of the inwardly extending flange 44, the engagement therewith of the spring arms 41 and 42 not only secures the members 20² and 21² in the desired position of angular adjustment but also secures these members against separation.

Having thus described my invention and illustrated its use, what I claim and desire to secure by Letters Patent is—

1. The combination of an automobile radiator, a threaded cap for said radiator operatively assuming varying rotative positions relative to the radiator, a member carried by the cap and contoured to have a definite ornamental position relative to the radiator, means providing central rotative movement between the cap and ornamental member to allow adjustment of the member to the aforesaid ornamental position relative to the varying positions of the cap, and means externally of the several recited elements facilitating the rigid interconnecting of the cap and ornamental member at the adjusted position.

2. The combination of an automobile radiator, a threaded cap for said radiator operatively assuming varying rotative positions relative to the radiator, a member carried by the cap and contoured to have a definite ornamental position relative to the radiator, a bolt providing central rotative movement between the cap and member to allow the aforesaid ornamental position to adjustment of the ornamental member relative to the varying positions of the cap, and a nut upon the bolt externally of the several recited elements facilitating the rigid interconnecting of the cap and ornamental member at the adjusted position.

In witness whereof, I have hereunder signed my name this 15th day of February, 1922.

WALTER F. HEATH, Jr.